US006265724B1

(12) United States Patent
Miettinen

(10) Patent No.: US 6,265,724 B1
(45) Date of Patent: Jul. 24, 2001

(54) GALVANIC ISOLATION COUPLING OF CURRENT LOOP

(75) Inventor: Erkki Miettinen, Helsinki (FI)

(73) Assignee: ABB Industries Oy, Helsinki (FI)

( * ) Notice: Subject to any disclaimer, the term of this patent is extended or adjusted under 35 U.S.C. 154(b) by 0 days.

(21) Appl. No.: 09/632,782

(22) Filed: Aug. 4, 2000

(30) Foreign Application Priority Data

Aug. 11, 1999 (FI) .................................................. 19991706

(51) Int. Cl.[7] .................................................. G02B 27/00
(52) U.S. Cl. ........................................ 250/551; 250/214 R
(58) Field of Search ................................ 250/551, 214 R, 250/216, 214 A, 214.1

(56) References Cited

U.S. PATENT DOCUMENTS 4,056,719 11/1977 Waaben ................................ 250/205
4,070,572 1/1978 Summerhayes ........................ 324/96
4,479,066 10/1984 Embree .
5,107,202 4/1992 Renda .................................... 324/96
5,805,062 9/1998 Pearlman ............................. 359/143
6,011,359 * 1/2000 Days .................................... 315/241

* cited by examiner

*Primary Examiner*—Que T. Le
(74) *Attorney, Agent, or Firm*—Dykema Gossett PLLC

(57) ABSTRACT

A galvanic isolation coupling of a current loop comprising an operational amplifier (A1) as a part of the current loop and an optoisolator (1) comprising two receivers. The isolation coupling also comprises a resistance (R1) that is connected in series to be a part of the current loop together with the operational amplifier (A1) and a transmitting LED (LED1) of the optoisolator, whereby the current loop is closed via the cathode of the transmitting LED (LED1), the coupling further comprising a zener diode (Z) and a capacitor (C1) connected in parallel and arranged between the positive and the negative voltage feed points of the operational amplifier, a photodiode (LED2) whose anode is coupled to the operational amplifier output (A1out) and the cathode to the cathode of the transmitting LED (LED1), a resistance (R2) whose first pole is coupled to a first pole (3) of the resistance (R1) and a second pole is coupled to the negative input (Uin−) of the operational amplifier, whereby the cathode of a first receiving PIN diode (PIN1) of the optoisolator (1) is coupled to the negative input (Uin−) of the operational amplifier and the anode is coupled to the cathode of the transmitting LED (LED1), and a circuit (4) that is galvanically isolated from the current loop, the circuit comprising a second receiving PIN diode (PIN2) of the optoisolator (1).

3 Claims, 1 Drawing Sheet

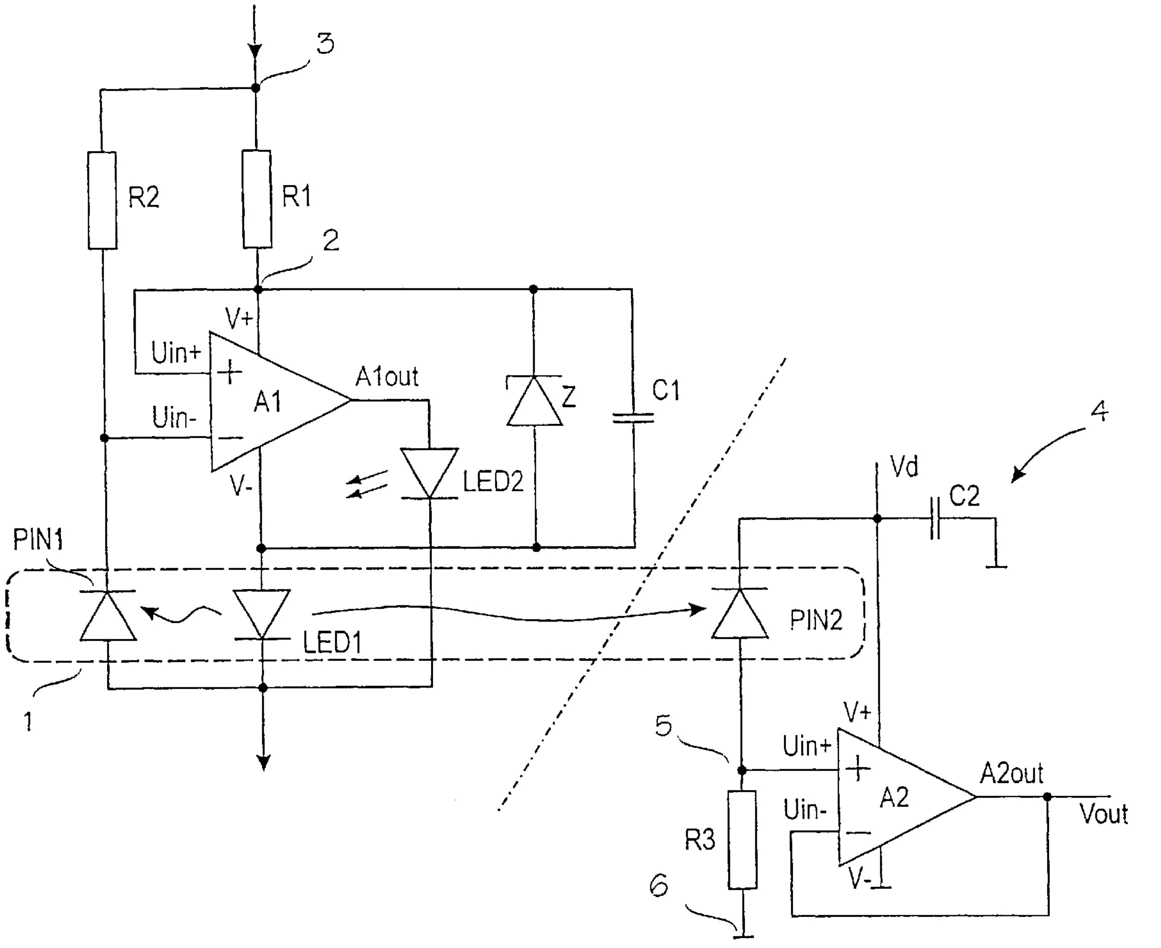
The Figure

GALVANIC ISOLATION COUPLING OF CURRENT LOOP

BACKGROUND OF THE INVENTION

The present invention relates to a galvanic isolation coupling of a current loop comprising an operational amplifier as a part of the current loop and an optoisolator comprising two receivers.

Current loops are commonly used for conveying measuring information. A constant-current signal passing through the current loop is generated by a measuring sensor and a measuring transmitter, and a variable to be measured can be e.g. temperature or pressure. The constant-current signal has a typical magnitude of 4 . . . 20 mA, whereby the lower limit of the measuring range of the variable to be measured is set for a 4 mA current signal, and correspondingly, the upper limit of the measuring range is set for a 20 mA current signal.

It is often desirable that the current loop which carries the current signal is galvanically isolated from the circuit utilizing measuring information. Measuring information is utilized as control equipment feedback, for instance. Galvanic isolation allows the measuring information to be processed in potential which differs from the current loop, whereby the reliability of the processing improves and the structure of the required couplings is simplified.

In order to get the information of the current signal in the current loop transferred undistorted to an isolated circuit, the isolation coupling should be highly reliable in structure and operation. Distortions occurring during the isolation have been a drawback with prior art isolation couplings of current loops, and as a consequence it has been difficult to utilize the measuring signal in an appropriate manner.

BRIEF DESCRIPTION OF THE INVENTION

The object of the present invention is to provide an isolation coupling of a current loop by which the above drawbacks can be avoided and which enables information transfer of a current signal of the current loop into a circuit galvanically isolated from the current loop in a reliable and accurate manner by using a simple circuit solution. This is achieved with a coupling according to the invention, which is characterized in that the isolation coupling also comprises a resistance that is connected in series as a part of the current loop together with an operational amplifier and a transmitting LED of an optoisolator such that a second pole of the resistance is coupled to a positive voltage feed point of the operational amplifier and the anode of the transmitting LED is coupled to a negative voltage feed point of the operational amplifier, whereby the current loop is closed via the cathode of the transmitting LED, the coupling additionally comprising a parallel coupling of a zener diode and a capacitor arranged between the positive and the negative voltage feed points of the operational amplifier such that the cathode of the zener diode is coupled to the operational amplifier's positive voltage feed point which is further coupled to the positive input of the operational amplifier, a photodiode whose anode is coupled to the operational amplifier output and cathode to the cathode of the transmitting LED, a resistance whose first pole is coupled to a first pole of the resistance and a second pole is coupled to a negative input of the operational amplifier, whereby the cathode of a first receiving PIN diode of the optoisolator is coupled to a negative input of the operational amplifier and the anode is coupled to the cathode of the transmitting LED, and a circuit which is galvanically isolated from the current loop and which comprises a second receiving PIN diode of the optoisolator.

The invention is based on the idea that an operational amplifier coupling together with an optoisolator comprising two receivers are employed for the galvanic isolation. Thus the second receiving PIN diode of the optoisolator can be used for feedback in the isolation coupling. Due to the feedback, the current of the PIN diode of the galvanically isolated circuit follows closely the current of the current loop.

An advantage of the isolation coupling of the invention is the high accuracy and broad bandwidth achieved thereby in the isolation. In addition, the isolation coupling to be used is simple to implement and has a reliable structure.

BRIEF DESCRIPTION OF THE DRAWINGS

In the following, the invention will be described in connection with preferred embodiments, with reference to the attached drawing, wherein The FIGURE illustrates a galvanic isolation coupling of a current loop in accordance with the invention.

DETAILED DESCRIPTION OF THE INVENTION

The FIGURE illustrates an isolation coupling of the invention, by which current signal information carried in a current loop is transferred to a galvanically isolated circuit. The current loop carries a current whose magnitude reflects the value of a variable to be measured. The invention is particularly suitable for use in connection with current signals of a living zero. The current signal of the living zero denotes the minimum value of the current signal that is 4 mA. Said current signal has an advantage that a possible fault occurring in the current loop or in a measuring sensor or transmitter can be detected if the magnitude of the current signal drops to zero ampere.

An isolation coupling of the invention comprises a resistance R1, an operational amplifier A1 and a transmitting LED LED1 of an optoisolator 1 in series with the current loop. The optoisolator can be, for instance, of the type IL300 manufactured by Siemens having two receiving PIN diodes. A first pole 3 of the resistance R1 is connected to the current loop such that the flow direction of the loop current is from the loop to the resistance R1. The second pole 2 of the resistance is coupled to the operational amplifier's A1 positive voltage feed V+ which is coupled to the positive input Uin+ of the operational amplifier. The resistance R1 is used for measuring the magnitude of the current loop on the basis of voltage loss in the resistance. For instance, when the resistance is 100 ohms, the voltage loss is 0.4 . . . 2 volts depending on the magnitude of the loop current.

According to the invention, the coupling also comprises a zener diode Z and a capacitor C1 coupled in parallel between the positive and the negative voltage feeds of the operational amplifier. The coupling is implemented such that the cathode of the zener diode is coupled to the positive voltage feed V+. Since the input current of the operational amplifier is typically much lower than the minimum current of the loop, the excess of the current is directed via the zener diode. Together with the capacitor C1, which acts as a filter capacitor, the zener diode thus constitutes a stabilized supply voltage source for the operational amplifier Al. Voltage tolerance of the zener diode can be e.g. 3.3 volts, whereby the supply voltage of the operational amplifier is also 3.3 volts.

According to the invention, a resistance R2, whose second pole is further coupled to the first pole 3 of the resistance R1, is coupled to the negative input of the operational amplifier A1. To the pole of the resistance R2 that is coupled to the operational amplifier is also coupled the cathode of a first receiving PIN diode PIN1 of the optoisolator. The anode of said PIN diode is in turn coupled to the cathode of the optoisolator's transmitting LED LED1 as illustrated in the FIGURE. A photodiode LED2 is coupled to the output A1 out of the operational amplifier A1 such that the anode of the photodiode is coupled to the output and the cathode to the cathode of the transmitting LED LED1.

The input poles of the operational amplifier Al are coupled to compare voltage loss in proportion to the loop current in the resistance R1, and in the resistance 2, voltage loss caused by the current of the PIN diode PIN1 used in the optoisolator feedback. It is characteristic of the operational amplifier to increase the output voltage to the maximum if the voltage of the positive input Uin+ exceeds the voltage of the negative input Uin−. Whereas, if the voltage of the negative input is higher, the voltage of the output assumes the minimum value. Due to feedback, the voltage difference between the operational amplifier inputs is always 0 volt, and consequently the voltages over the resistances R1 and R2 are equal. The state of the amplifier output depends on a differential potential difference between the input poles of the amplifier such that the amplifier allows through the transmitting LED LED1 of the optoisolator only a current of the magnitude to make voltage losses in the abovementioned resistances equal within the limits of the amplifier offset error.

Thus, the portion passing through the light-emitting diode LED1 of the optoisolator 1 can be controlled by the operational amplifier A1. If the output level of the amplifier rises in a positive direction in relation to the negative supply voltage of the amplifier, the current passing through the indicating LED2 coupled to the amplifier output and bypassing the optoisolator transmitting LED rises as well. According to a preferred embodiment of the invention, the indicating LED2 can be replaced by a suitably designed resistance or diodes.

PIN diodes used in optoisolators operate such that by the action of the light emitted by the transmitting LED a current will pass in the reverse direction of the PIN diode. The magnitude of the current is in proportion to the intensity of light emitted by the transmitting LED, the light intensity being, in turn, in proportion to the magnitude of the current passing through the transmitting LED. Hence, the internal light level of the optoisolator always sets such that the current of the PIN diode PIN1 follows closely the loop current, but lower in an amount corresponding to the ratio of the inverse values of the resistances. If the resistance R1 is 100 Ω as mentioned above and the resistance R2 is 10 kΩ, the current of the PIN diode PIN1 is one hundredth part of the loop current. From the viewpoint of the present invention, it is important that said resistances R1 and R2 are accurately rated with respect to one another.

Thus, the coupling of the invention operates in such a manner that when the loop current passes through the resistance RI, the operational amplifier A1 and the transmitting LED LED1, a voltage loss is produced in the resistance R1, and at the same time, the potential of the positive input of the operational amplifier changes. Due to the change in the potential, the operational amplifier reacts by changing the magnitude of its output A1 out, directing at the same time more or less current in the loop to pass through the indicating LED LED2. Simultaneously, the current flowing through the series connection produces in the transmitting LED of the optoisolator a given light level, which is in proportion to the magnitude of the current, by the action of which the resistance R2 lets through a current of the magnitude that cancels the voltage difference between the positive and the negative inputs of the optoisolator. The circuit of the invention combined to the current loop provides exactly the desired result, whereby the current of the PIN diode is accurately known.

The optoisolator according to the solution of the invention comprises two receiving PIN diodes PIN1, PIN2, both of which react in the same manner to the light emitted by the transmitting LED1. According to the invention, the PIN diode PIN1 is used for feedback to the operational amplifier A1, and the PIN diode PIN2 is used for providing the desired galvanic isolation from the current loop circuit.

According to one embodiment of the invention, the circuit that is galvanically isolated from the current loop circuit comprises, apart from the PIN diode PIN2, an operational amplifier A2 and a resistance R3 that is coupled between the anode of the PIN diode and the ground potential of the isolated circuit. Said anode is also coupled to the positive voltage input Uin+ of the operational amplifier A2. The cathode of the PIN diode, in turn, is coupled to the operational amplifier's A2 positive voltage feed V+, which is connected to the operating voltage Vd of the isolated circuit.

The operational amplifier is used for forming a voltage follower coupling by coupling the negative voltage input Uin− directly to the output A2out. The coupling also comprises a capacitor C2, which is coupled between the operating voltage and the ground potential and which is intended for serving as a filter capacitor for the operating voltage. In addition, the negative voltage feed of the operational amplifier is connected to the ground potential of the circuit.

By means of a coupling of this kind it is possible to convert the current information in the current loop into a voltage level in a circuit that is galvanically isolated from the current loop. A current of exactly the same magnitude as the current that flows in the feedback PIN diode PIN1 is generated in the PIN diode PIN2 of the isolated circuit. The resistance in the isolated circuit should have a perfect match with the resistances in the current loop circuit. The resistance R3 should be exactly the same as the sum of the resistances R1 and R2. If the resistance magnitudes are R1=100 Ω, R2=10 Ω, the resistance R3 will be 10.1 kΩ. The above-mentioned constant-current signal thus generates a voltage Vd at the output A2out of the operational amplifier A2, the voltage varying according to the loop current within the range of 0.4 . . . 2.0 volts.

The operational amplifier A2 is intended for buffering the voltage onto a useful impedance level. If the signal, which is galvanically isolated from the loop current circuit, is utilized in a circuit with extremely high impedance, the amplifier A2 is not necessarily needed.

It is obvious to a person skilled in the art that as technology progesses the basic idea of the invention can be implemented in a variety of ways. Thus, the invention and its embodiments are not restricted to the examples described above but they may vary within the scope of the claims.

What is claimed is:

1. A galvanic isolation coupling of a current loop comprising an oprational amplifier as a part of the current loop and an optoisolator comprising two receivers, wherein the isolation coupling also comprises a first resistance that is connected in series as a part of the current loop together with an operational amplifier and a transmitting LED of an optoisolator such that a second pole of the resistance is coupled to a positive voltage feed point of the operational amplifier and the anode of the transmitting LED is coupled to a negative voltage feed point of the operational amplifier, whereby the current loop is closed via the cathode of the transmitting LED, the coupling additionally comprising a parallel coupling of a zener diode and a capacitor arranged between the positive and the negative voltage feed points of the operational amplifier such that the cathode of the zener diode is coupled to the operational amplifier's positive voltage feed point which is further coupled to the positive input of the operational amplifier, a photodiode whose anode is coupled to the operational amplifier output and cathode to the cathode of the transmitting LED, a second resistance whose second pole is coupled to a first pole of the first resistance and a second pole is coupled to a negative input of the operational amplifier, whereby the cathode of a first receiving PIN diode of the optoisolator is coupled to a negative input of the operational amplifier and the anode is coupled to the cathode of the transmitting LED, and a circuit which is galvanically isolated from the current loop and which comprises a second receiving PIN diode of the optoisolator.

2. An isolation coupling as claimed in claim 1, comprising in place of the photodiode two diodes connected in series or a resistance.

3. An isolation coupling as claimed in claim 1, wherein the circuit that is galvanically isolated from the current loop further comprises an operational amplifier whose positive voltage feed point is coupled to the operating voltage of the circuit isolated from the current loop and the negative voltage feed point is coupled to the ground potential of the circuit, a second receiving PIN diode being coupled between the positive voltage feed point and the positive input of the operational amplifier such that the cathode of the diode is coupled to the positive input, a resistance whose first pole is coupled to the anode of the second PIN diode and second pole is coupled to the ground potential of the circuit isolated from the current loop, a capacitor which is coupled between the positive voltage feed point of the operational amplifier and the ground potential of the isolated circuit, the negative input of the operational amplifier being coupled to the operational amplifier output.

* * * * *

UNITED STATES PATENT AND TRADEMARK OFFICE

CERTIFICATE OF CORRECTION

PATENT NO. : 6,265,724 B1
DATED : July 24, 2001
INVENTOR(S) : Erkki Miettinen

It is certified that error appears in the above-identified patent and that said Letters Patent is hereby corrected as shown below:

Title page,
Item [73], Assignee, should read as follows:
-- [73] Assignee: ABB Industry Oy, Helsinki (FI) --

Signed and Sealed this

Fourteenth Day of May, 2002

*Attest:*

JAMES E. ROGAN

*Attesting Officer* *Director of the United States Patent and Trademark Office*